United States Patent
Bauer et al.

(10) Patent No.: US 6,926,127 B2
(45) Date of Patent: Aug. 9, 2005

(54) FRICTION MEMBERS MADE FROM FIBER-REINFORCED CERAMIC COMPOSITE MATERIALS AND PROCESSES FOR MAKING FRICTION MEMBERS

(75) Inventors: Moritz Bauer, Augsburg (DE);
Michael Heine, Allmannshofen (DE);
Andreas Kienzle, Thierhaupten (DE);
Ingrid Krätschmer, Biberbach (DE);
Rainer Zimmermann-Chopin, Ellgau (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 10/304,120

(22) Filed: Nov. 25, 2002

(65) Prior Publication Data

US 2003/0106751 A1 Jun. 12, 2003

(30) Foreign Application Priority Data

Nov. 23, 2001 (DE) .......................... 101 57 583

(51) Int. Cl.$^7$ .............................................. F16D 69/02
(52) U.S. Cl. .............................. 188/218 XL; 188/250 B
(58) Field of Search ....................... 188/218 R, 218 XL, 188/250 B

(56) References Cited

U.S. PATENT DOCUMENTS

| 4,457,967 | A | * | 7/1984 | Chareire et al. ............. 428/212 |
| 6,030,913 | A | | 2/2000 | Heine et al. |
| 6,231,791 | B1 | | 5/2001 | Heine et al. |
| 6,302,246 | B1 | * | 10/2001 | Naumann et al. ...... 188/218 XL |
| 6,316,086 | B1 | * | 11/2001 | Beier et al. ............... 428/293.4 |
| 6,666,310 | B1 | * | 12/2003 | Berreth et al. .......... 188/251 A |

FOREIGN PATENT DOCUMENTS

| DE | 44 38 455 C1 | 5/1996 |
| DE | 197 10 105 A | 9/1998 |
| DE | 197 11 829 C1 | 9/1998 |
| DE | 197 21 473 A1 | 12/1998 |
| DE | 198 34 704 A1 | 2/2000 |
| DE | 198 56 721 A1 | 6/2000 |
| DE | 199 39 545 A1 | 2/2001 |

* cited by examiner

*Primary Examiner*—Matthew C. Graham
(74) *Attorney, Agent, or Firm*—Laurence A. Greenberg; Werner H. Stemer; Ralph E. Locher

(57) ABSTRACT

Friction members are composed of a ceramic composite material. The friction members can be used for motor vehicles as a clutch disk for friction clutches, for transmitting motive power, or as a brake disk. A friction zone of the friction member is composed of ceramic, in particular of Si and SiC. A core zone of the friction member is made from fiber-reinforced C/SiC, in particular of long fiber woven fabric-reinforced and short fiber-reinforced C/SiC.

8 Claims, 2 Drawing Sheets

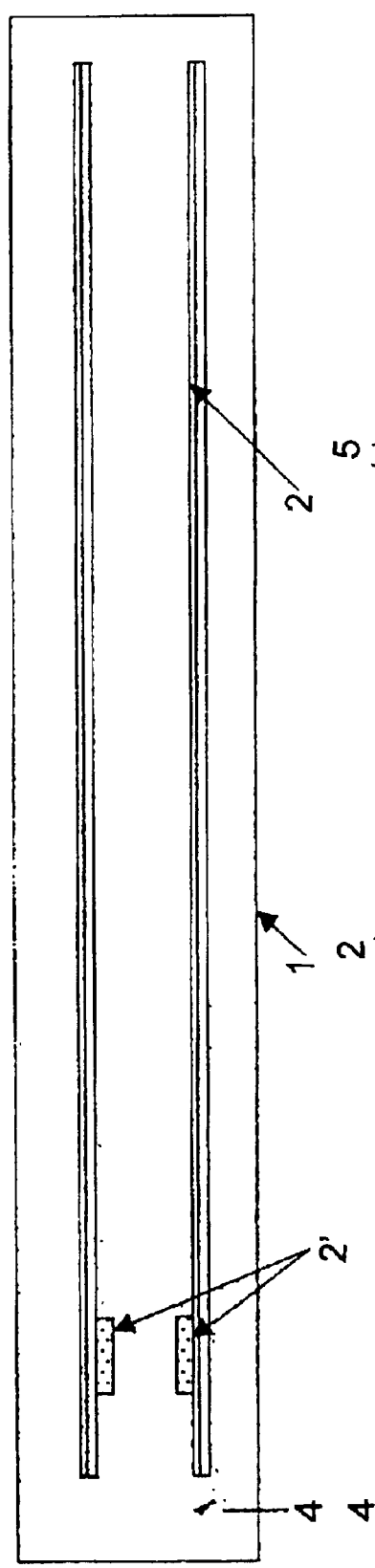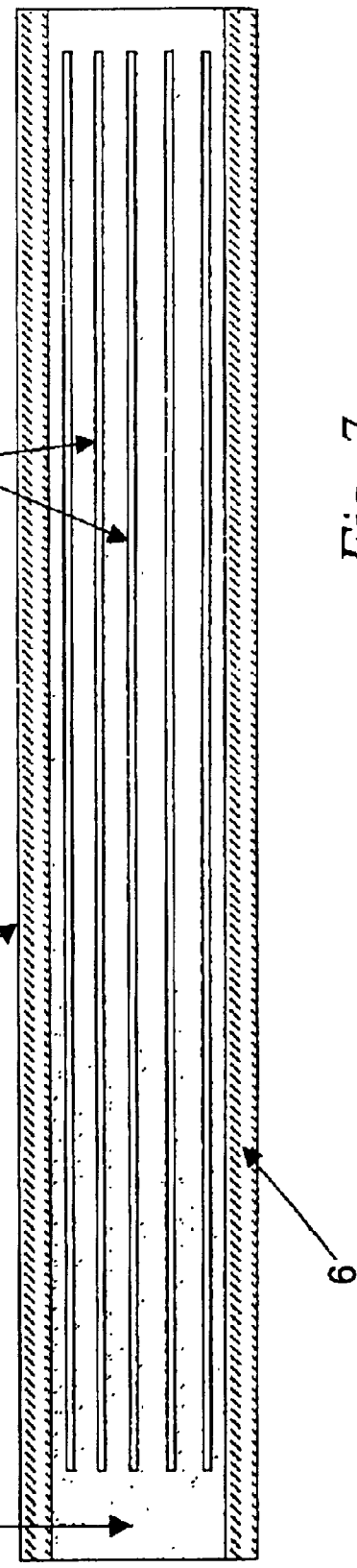

FRICTION MEMBERS MADE FROM FIBER-REINFORCED CERAMIC COMPOSITE MATERIALS AND PROCESSES FOR MAKING FRICTION MEMBERS

BACKGROUND OF THE INVENTION

FIELD OF THE INVENTION

The invention relates to friction members made from fiber-reinforced ceramic composite materials. In particular, the invention relates to materials for friction members and to a production process for friction members, in particular for friction linings, clutch disks, or brake disks, wherein the ceramic composite materials in particular include ceramic materials reinforced with carbon fibers, specifically short and long fiber-reinforced C/SiC core material (carbon fiber-reinforced materials, the matrix of which contains silicon carbide) and ceramic friction material predominantly including Si and SiC phases.

It has long been known to use mineral fiber materials for the friction linings of clutches. Technically, asbestos materials are particularly suitable for this purpose. However, using these materials containing asbestos is no longer environmentally acceptable, as a result of which materials based on other mineral fibers are virtually exclusively used. Due to the more stringent requirements placed upon the tribological properties of automotive clutch disks by increased engine performances, vehicle speeds, and vehicle weights, new combinations of materials are increasingly also being investigated.

Carbon fiber-reinforced composite materials or ceramics, in particular with a matrix containing SiC, are of particular interest in this context. These materials are distinguished by elevated heat resistance, low wear and, in some cases, good tribological properties. Published, non-prosecuted German Patent Application No. DE 199 39 545 A1 proposes using clutch disks with friction linings made from carbon fiber-reinforced silicon carbide (SiC) in order to increase loading capacity and performance relative to the prior art. The disadvantage in this connection is that a dense SiC matrix with carbon fiber reinforcement can only be produced through a technically demanding process. Technological progress in material synthesis has been made in this respect by liquid silicon infiltration of carbon fiber-reinforced preforms containing carbon, this operation generally giving rise to carbon fiber-reinforced composite materials with a Si and SiC matrix. It is known from German Patent No. DE 44 38 455 C1 to produce friction units, in particular brake and clutch members, from carbon fiber-reinforced Si/SiC by silicon infiltration of carbon fiber-reinforced carbon members (CFRC members) provided with cavities and recesses. The process in particular gives rise to internally ventilated friction disks of C/SiC (or, in the event of incomplete carbon conversion in the matrix, C/C—SiC). Joining together different CFRC members here makes it possible to form a friction member of complex geometry. However, the recesses and cavities reduce the strength of the member, which is disadvantageous, in particular at the elevated rotational speeds or velocities encountered by clutch disks.

German Patent No. DE 198 34 704 C2 proposes a multilayer structure for a CFRC friction disk including a support member of woven carbon fiber fabric and a wear member or wear layer containing short carbon fibers. Strength in the radial direction is enhanced in this structure and the favourable friction properties of short fiber-reinforced CFRC at the surface are exploited. However, the great difference in thermophysical properties between short and long fiber zones is disadvantageous for the further liquid siliconization process for the production of C/SiC materials. Adherence at the interface between the long fiber zone, where the fibers are oriented in the plane of the disk, and the short fiber zone, where the fibers are oriented isotropically, is likewise too low for many applications. This is particularly the case when the support member and friction surface exhibit very different thermophysical properties.

German Patent No. DE 197 21 473 C2 also describes a multilayer structure for a friction disk made from a carbon fiber-reinforced ceramicised composite material. The predominant proportion of the carbon fibers, at least in the friction zone, should as far as possible be aligned parallel to the surface normals of the friction surface in order to improve heat dissipation from the friction surface into the interior of the friction unit.

SUMMARY OF THE INVENTION

It is accordingly an object of the invention to provide friction members made from fiber-reinforced ceramic composite materials and processes for making friction members that overcome the hereinafore-mentioned disadvantages of the heretofore-known devices of this general type and that improves the strength of fiber-reinforced friction members, in particular C/SiC friction disks, in respect of rotational stresses, in particular at high rotational speeds, while simultaneously improving adherence between the friction zone and support zone. Furthermore, the friction surface should be optimized with regard to friction and wear properties and it should furthermore be possible to produce the friction members using the industrially efficient, cost-effective liquid siliconization process.

With the foregoing and other objects in view, there is provided, in accordance with the invention, a friction member, in particular a C/SiC friction disk, the core zone or support zone of which includes short fiber-reinforced C/SiC with long fiber zones, in particular in the form of woven fabric plies, tapes or strips. While the short fibers are predominantly isotropically aligned, the long fibers have preferential directions, in particular in the form of two-dimensional networks or frameworks that are enveloped or permeated by the matrix of short fiber-reinforced C/SiC. The friction surface includes a composite ceramic that is of a related nature to the short fiber-reinforced C/SiC of the support zone.

The invention accordingly relates to a friction member made from fiber-reinforced ceramic materials. The member includes a core or support zone and at least one friction layer. The core zone of the friction layer contains fibers in the form of long fiber bundles, woven, knitted, nonwoven, or laid fabrics, together with fibers in the form of short fibers, and wherein the friction layer contains a proportion by weight of less than 10%, preferably of less than 5% and particularly preferably of at most 2% of long fibers, and up to 35% of short fibers, with at least 70%, preferably at least 80% and particularly preferably at least 85% of the long fibers in the core zone being oriented in the plane of the friction member and the orientation of the short fibers in the core zone being substantially isotropic.

"Substantially isotropic" means an orientation such that at most 30% of the fibers have a common preferential direction.

According to the invention, the fibers forming the long fiber reinforcement of the core zone are aligned geometrically in such a manner that an optimum strength distribution for rotational loading is established, in particular with large proportions in the circumferential direction. Alignment of the partially overlapping long fibers in the circumferential direction and parallel to secants, which fibers are in particular used in the form of woven fabric tapes or strips, distinctly improves the strength of the component with regard to rotational loading, expressed as the maximum rotational speed without failure.

Carbon fibers and/or graphite fibers are preferably used as reinforcing fibers. The support zone matrix preferably contains silicon carbide phases and additionally phases which contain metallic silicon, optionally alloyed with other metals, and optionally phases which contain elemental carbon and/or carbides of elements other than silicon.

A further aspect of the invention is the composition of the friction surface or friction layer of a composite ceramic that is of a related type to the short fiber material of the core zone and which in particular includes a large proportion of Si and SiC phases. This improves the wear resistance and coefficient of friction of the friction surface while ensuring, due to their similar thermal expansion, an unweakened bond to the support zone of the friction member.

Another aspect is the use of the composite material according to the invention as a friction element or friction disk for clutch disks and brake disks in vehicles.

The material composite including a long fiber-reinforced C/SiC core zone and a C/SiC friction layer of the friction member according to the invention is advantageously produced by liquid infiltration of fiber-reinforced or fiber bundle-reinforced carbon-containing preforms with silicon melts. Such processes are, for example, known from German published non-prosecuted patent application DE 198 56 721 A1, German Patent No. DE 197 11 829 C1, and German published, non-prosecuted patent application DE 197 10 105 A1, which corresponds to U.S. Pat. Nos. 6,231,791 and 6,030,913.

According to the invention, the friction member in the core zone has fiber reinforcement of both short fibers and long fibers, such that the fiber length distribution is characterized by at least two distinctly separate fractions. Hereafter, fibers should be taken to mean not only both short and long fibers, but also in particular fibers coated with polymers or carbonizable substances and/or the pyrolysis products thereof. Preferred fibers are carbon-containing fibers, particularly preferably carbon or graphite fibers, and fibers containing compounds of at least two of the elements Si, C, B, Ti, or N.

The short fibers, the core zone of the C/SiC friction member are preferably combined in bundles or agglomerates with a carbon-containing matrix. Short fibers should here and hereafter also be taken to include short fiber bundles. The short fibers are substantially isotropically oriented, i.e. in particular, without a radial preferential direction. The length distribution of the short fibers is typically in the range from 0.001 to 30 mm, preferably 0.1 to 15 mm and particularly preferably 0.2 to 5 mm.

In contrast, the long fibers in the core zone of the friction member do exhibit a preferential orientation, in particular in the form of a two-dimensional framework aligned parallel to the plane of the disk. The long fibers of the core zone are conventionally combined in bundles, rods, laid, woven, or knitted fabrics and are hereafter all designated long fiber bundles. The starting material used particularly preferably includes plastics reinforced with C fibers (CFRP) or carbon materials reinforced with C fibers (CFRC), wherein the C fibers are present as woven bundles or tapes. Prepreg tapes or CFRP rods of pultruded fibers may also be used. The long fiber bundles in the friction member according to the invention are preferentially oriented, in particular in the case of disk-shaped or circular ring-shaped friction members in the circumferential direction, radially and/or parallel to secants. A plurality of long fiber bundles are typically aligned in well-ordered manner relative to one another, in particular rotationally symmetrically about the axis of rotation in the case of circular ring- or disk-shaped friction members. Central-symmetrical shapes, star shapes or spider's web-shaped configurations are particularly preferred. At the same time, it is advantageous for different long fiber bundles to cross one another or for there to be points of intersection. The points of intersection in particular allow the individual long fiber bundles to be fixed and to form a stable supporting framework, which is no longer deformed during the subsequent friction member shaping process. A selection of typical geometric configurations for circular ring- or disk-shaped friction members according to the invention is illustrated in FIGS. 1 to 7.

Other features that are considered as characteristic for the invention are set forth in the appended claims.

Although the invention is illustrated and described herein as embodied in friction members made from fiber-reinforced ceramic composite materials and processes for making friction members, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 6 shows a section parallel to the axis of rotation of a circular ring-shaped friction member through a configuration according to that shown in FIG. 3 along line I—I, wherein only the core zone is shown; and FIG. 7 shows a section parallel to the axis of rotation of a circular ring-shaped friction member through a configuration according to that shown in FIG. 4 along line II—II, wherein a friction zone is illustrated on both sides of the core zone.

DESCRIPTION OF THE PREFERRED EMBODIMENTS

Figure 1:
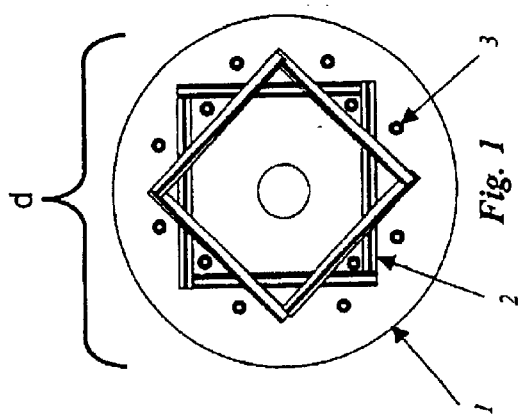
FIG. 1 is a plan view of a section parallel to the friction surfaces through a circular ring-shaped friction member according to the invention, with long fiber bundles lying in the direction of secants.

Referring now to the figures of the drawings in detail and first, particularly to FIG. 1 thereof, there is shown a plan view of a section parallel to the bottom or top surface of a circular ring-shaped friction member 1, in which in each case four long fiber bundles 2 are constructed in two adjoining plies one above the other in the direction of secants in the core or support zone of the friction member. The four long fiber bundles of the first ply are rotationally offset by 45° around the axis of the friction member relative to the four long fiber bundles of the following ply. The disk-shaped friction member additionally has holes 3 formed therein of circular cross-section that form a passage between the bottom and top surfaces. These holes may run parallel to or inclined at an angle of up to 45° relative to the axis of rotation.

Figure 2:
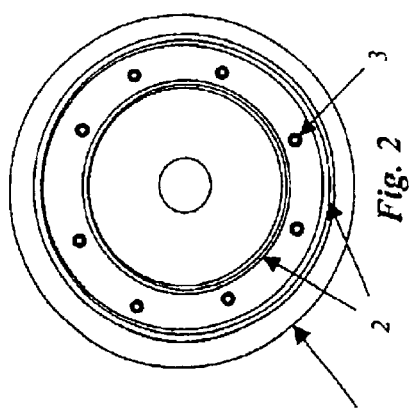
FIG. 2 is a plan view of a section parallel to the friction surfaces through a circular ring-shaped friction member, with two endless long fiber bundles extending circularly.

FIG. 2 is a plan view of a section parallel to the friction surfaces through a disk-shaped friction member 1, with two circularly configured long fiber bundles 2. The friction disk additionally has holes 3 formed therein of circular cross-section which form a passage between the bottom and top surfaces. These holes may run parallel to or inclined at an angle of up to 45° relative to the axis of rotation of the friction disk.

Figure 3:
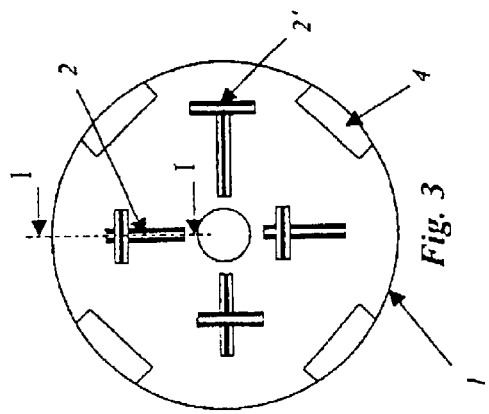
FIG. 3 is a plan view of a section parallel to the friction surfaces through a circular ring-shaped friction member with four radially extending long fiber bundles to each of which a further long fiber bundle is connected at an angle of approximately 90°.

FIG. 3 is a plan view of a section parallel to the friction surfaces through a disk-shaped friction member 1, with four long fiber bundles 2 configured in a radial direction, in each case at an angle of 90° one to the other, with a shorter long fiber bundle 2' being in each case configured at an angle of 90° to the radial long fiber bundle 2. These long fiber bundles 2' configured in the direction of a secant may here be disposed at varying distances from the axis of rotation of the friction disk, as shown (at the 3 o'clock position of an imaginary clock face) either at the end close to the periphery or displaced towards the center of the friction disk (shown counterclockwise in FIG. 3 at the twelve-, nine- and six-o'clock positions). In this case, there are recesses 4 in the support zone configured symmetrically around the periphery which reduce the disk's moment of inertia and thus permit a higher rotational speed before failure of the disk.

Figure 4:
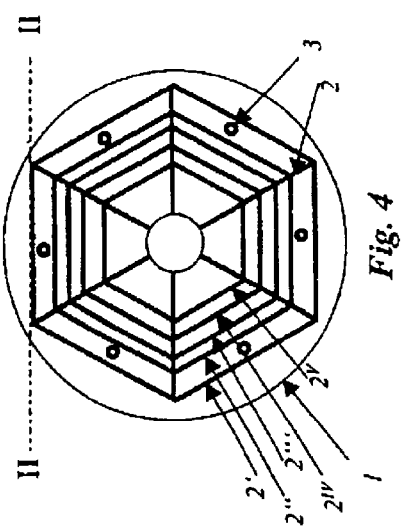
FIG. 4 is a plan view of a section parallel to the friction surfaces through a circular ring-shaped friction member with a spider's web-shaped configuration of the long fiber bundles.

FIG. 4 is a plan view of a section parallel to the friction surfaces through a disk-shaped friction member 1, with long fiber bundles 2 and 2' to $2^V$, which are configured in the manner of a 6-rayed spider's web. Long fiber bundles 2 here extend in a radial direction and each of the segments divided by these radial long fiber bundles contains parallel long fiber bundles 2', 2", $2^{III}$, $2^{IV}$ and $2^V$ oriented in the direction of a secant and the ends of which, in the embodiment shown, are in each case in contact with two adjacent radial long fiber bundles 2. The friction disk additionally has holes 3 formed therein of circular cross-section which form a passage between the bottom and top surfaces. These holes may run parallel to or inclined at an angle of up to 45° relative to the axis of rotation of the friction disk.

Figure 5:
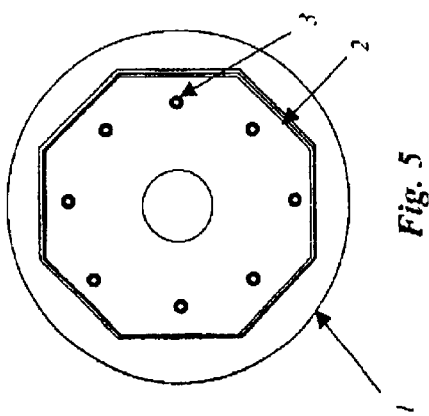
FIG. 5 is a plan view of a section parallel to the friction surfaces through a circular ring-shaped friction member, with a polygram-shaped configuration of the long fiber bundles.

FIG. 5 is a plan view of a section parallel to the friction surfaces through a disk-shaped friction member with long fiber bundles 2, which are configured in the shape of a five-pointed star (pentagram), with the ends of the long fiber bundles 2 being in contact with each of the tips. The friction disk additionally has holes 3 formed therein of circular cross-section which form a passage between the bottom and top surfaces. These holes may run parallel to or inclined at an angle of up to 45° relative to the axis of rotation of the friction disk.

FIG. 6 is a section through a disk-shaped friction member 1 along the line I—I, with only the core or support zone being shown here. The matrix 4 contains the long fiber bundles 2 embedded in a radial direction and the long fiber bundles 2' in a direction parallel to the secant.

Finally, FIG. 7 shows an embodiment of a disk-shaped friction member 1, in which the long fiber bundles 5 are disposed in two or more parallel plies one on top of the other in the matrix 4. Friction layers 6 are applied onto both outer surfaces of the support or core zone, the friction layers containing exclusively short fibers as the reinforcing material.

The length of the long fibers and of the long fiber bundles clearly exceeds that of the short fibers. The length, expressed relative to friction disk diameter d, is typically in the range from 10% to virtually 100% of d; for the radial direction typically from 10% to 50% of d, for the preferred alignment parallel to secants from 10 to 80% of d and for the particularly preferred alignment in the circumferential direction 10 to 100% of disk circumference. The length is, however, at least 50 mm. The width of the long fiber bundles is typically at least 0.5 mm, preferably at least 2 mm and particularly preferably at least 4 mm. The thickness is generally less than 20% of the disk thickness, preferably 0.05 to 3 mm and particularly preferably 0.1 to 1 mm. The resulting cross-section is preferably oval or particularly preferably flat in shape. The width, thickness and conditioning (pretreatment, in particular coating or impregnation) of the long fiber bundles, woven or knitted fabrics are selected such that liquid siliconization brings about only the slightest possible conversion of the carbon in the fibers into silicon carbide. In this manner, even after siliconization, continuous long fiber bundles are obtained which result in the required increase in strength of the disk.

One particular advantage of the invention is that the quantity and configuration of the fiber bundles permits three-dimensional penetration of the friction member with the short fiber-reinforced C/SiC phase. In this manner, a continuous phase of short fiber-reinforced C/SiC is formed. The quantity of short fiber-reinforced C/SiC phase within the core zone is here conventionally greater than 10 vol. %, preferably greater than 30 vol. % and particularly preferably greater than 40 vol. %.

In contrast to the core zone structure known from the prior art that includes continuous woven fabric mats, prepreg plies, nonwovens and the like, the embodiment according to the invention includes a short fiber-reinforced C/SiC phase that is continuous perpendicularly to the plane of the disk. The long fiber bundles are virtually completely enveloped by the short fiber-reinforced C/SiC phase. As a consequence, highly advantageous utilization of the reinforcing action and strength distribution of the friction member is achieved.

Another aspect of the invention is the possibility of incorporating intended reinforcement, in particular in the case of use as a friction or clutch disk, at points where force is introduced into the disk. Typical points are fastening holes and slots in the driving plate, or fastening holes for connection to the hub in disk brakes. In comparison with unstructured plies of woven fabric, the long fiber reinforcement, in particular in form of stable inserts, may be configured in such a manner that when holes or slots are made in the CFRC preform or the siliconized disk, the long fiber plies are not damaged. To this end, recesses are provided in the woven or knitted fabric parts at those points where holes will subsequently be made.

According to the invention, the friction layer or friction lining of the friction member differs from the structure of the core zone by a reduced fiber content, or a higher proportion of Si and SiC phases. Advantageously, the average fiber lengths in the friction layer are also shorter than those of the other short fibers. Conventionally, the fraction by weight of SiC phases is greater than 40% and the fraction by weight of Si phases is less than 35%, in each case relative to the weight of the composite material. A composition with a fraction by weight of SiC phase of greater than 70% is preferred, with 80 to 99% being particularly preferred. The fraction by weight of fibers is thus conventionally less than 35%. The thickness of the friction layer is typically at least 0.1 mm, preferably at least 0.5 mm and particularly preferably at least 1 mm.

Friction members according to the invention which include matrices containing silicon carbide are produced by initially producing porous green bodies containing carbon.

The long fiber bundles are here conventionally placed centrally between layers of green body mixture containing short fibers or short fiber bundles in a compression mould. If two or more planes of reinforcement are used within the disk, the individual plies of long fiber bundles are separated one from another by a layer of the green body mixture. The individual long fiber bundles are advantageously first joined together into a stable two-dimensional framework. To this end, the bundles are adhesively bonded together at the points of intersection, preferably using pyrolyzable organic polymers. The framework may then in known manner be placed as an insert between layers of short fiber-reinforced or short fiber bundle-reinforced green body mixture. In addition to the short fibers or fiber bundles, the green body mixture optionally also contains fillers, together with curable and carbonizable resins and/or pitches. Then, the green body mixture with the long fiber bundle reinforcement is compressed and cured at elevated temperatures, conventionally between 120 and 300° C. It is, however, also possible to carry out shaping by other methods known from fiber composite materials technology, such as for example RTM ("reaction transfer moulding"). In another advantageous embodiment of the invention, the framework provided for reinforcement is woven or knitted from fibers. A certain degree of texturing of the short fiber content may be brought about by the shaping process, for example on compression of the green body mixture or on injection of the resin in the RTM process. This may result in the fibers and fiber bundles being oriented to a relatively large extent in the plane of the friction member. Since this configuration differs significantly from the preferential orientation of the long fiber bundles, this configuration is also hereinafter designated isotropic.

The green body corresponding to the subsequent friction layer, which may be compressed together with the core member or also separately produced and subsequently adhesively bonded thereto, must have a reasonable carbon content in line with the desired subsequent SiC content. The carbon arising as reaction partner of the liquid silicon during the subsequent liquid siliconization is obtained from carbon-containing fillers, typically graphite, pyrolysis residues of resins and pitches and reactive short fiber bundles. It is possible completely to dispense with fibrous material for the green body mixture of the friction layer. In this manner, it is also possible to produce a completely fiber-free friction layer after siliconization.

The green bodies produced by pressing and curing are converted into a CFRC member by carbonization at approximately 750 to approximately 1100° C. under protective gas or in a vacuum, or graphitization (at temperatures above approximately 1800° C.). Thereupon, the CFRC member is siliconized at temperatures in excess of 1420° C. by infiltration with a silicon melt, which may also include further metals or semimetals in fractions by weight of up to 50%. During this operation, at least a proportion of the carbon is converted in known manner into SiC by chemical reaction. If further metals are used, Si and SiC phases are formed together with mixed phases of silicon and the metals used and phases of metal carbides and/or metal silicides. This means that the metals or semimetals of the matrix may assume the form of a solution in the Si or SiC, an Si alloy, a precipitate in the Si or SiC, a discrete Si compound or a largely separate phase.

Typically, these metals or semimetals are introduced into the composite material as alloy constituents of the silicon during liquid siliconization and accumulate in the silicon phases of the material. Preferred metals include in particular Mo, Ni, Cr, Ti, Fe, Cu, Al, and B.

We claim:

1. A friction member of fiber-reinforced ceramic material, comprising:

a core zone;

at least one friction layer defining a plane;

reinforcing fibers including short fibers and long fibers, said short fibers having a length of from 0.001 mm to 30 mm, said long fibers having a length of at least 50 mm, and said long fibers being present in a form selected from the group consisting of bundles, rods, laid fabrics, knitted fabrics and woven fabrics;

at least 70% of said long fibers in said core zone being aligned parallel to said plane of said at least one friction layer, and said short fibers in said core zone having a substantially isotropic orientation; and said long fibers in said at least one friction layer having a proportion by weight of less than 10%, and said short fibers in said at least one friction layer having a proportion by weight of up to 35%.

2. The friction member according to claim 1, wherein said core zone is a fiber-reinforced ceramic composite material with a matrix containing Si and SiC.

3. The friction member according to claim 1, wherein said reinforcing fibers are selected from the group consisting of carbon fibers, graphite fibers, and fibers containing compounds of at least two elements selected from the group consisting of Si, C, B, Ti, and N.

4. The friction member according to claim 1, further comprising:

a fraction by weight of SiC phases in said friction layer of at least 40%; and a fraction by weight of Si phases in said friction layer of at most 35%.

5. The friction member according to claim 1, wherein:

said core zone and friction zone together form a disk and have a diameter;

said short fibers in said core zone are at most 30 mm long; and said long fibers in said core zone are at least one of 50 mm long and longer than 10% of said diameter of said disk.

6. The friction member according to claim 1, wherein said long fibers are combined in a configuration selected from the group consisting of bundles, laid fabric, woven fabric, and knitted fabric and having a width of at least 0.5 mm and a thickness of at least 0.05 mm.

7. The friction member according to claim 1, wherein said core zone and friction zone together form a disk; and said long fibers have a configuration selected from the group consisting of at least partially aligned circumferentially, parallel to secants of said disk, reticulate, spiral, and star-shaped.

8. The friction member according to claim 7, wherein said long fibers form a fabric, said fabric being selected from the group consisting of a continuous woven fabric and a knitted fabric with recesses.

* * * * *